(12) United States Patent
Hook

(10) Patent No.: US 7,841,757 B1
(45) Date of Patent: Nov. 30, 2010

(54) FISHING ROD ILLUMINATION SYSTEM

(76) Inventor: David A. Hook, 1825 Demastus La., Ocoee, FL (US) 34761

( * ) Notice: Subject to any disclaimer, the term of this patent is extended or adjusted under 35 U.S.C. 154(b) by 225 days.

(21) Appl. No.: 12/019,239

(22) Filed: Jan. 24, 2008

Related U.S. Application Data

(63) Continuation-in-part of application No. 11/349,580, filed on Feb. 7, 2006, now Pat. No. 7,347,607.

(51) Int. Cl.
*F21V 33/00* (2006.01)
(52) U.S. Cl. .................. 362/577; 43/17.5; 43/17.6
(58) Field of Classification Search .......... 362/577, 362/581, 158; 43/17.5–17.6, 42.31
See application file for complete search history.

(56) References Cited

U.S. PATENT DOCUMENTS

| 2,711,044 | A | * | 6/1955 | Woods | 43/17.6 |
|---|---|---|---|---|---|
| 3,721,033 | A | * | 3/1973 | Haynes | 43/17.6 |
| 4,888,905 | A | * | 12/1989 | Garr | 43/17.6 |
| 5,355,285 | A | * | 10/1994 | Hicks | 362/572 |
| 5,414,951 | A | * | 5/1995 | Martin | 43/17.5 |
| 6,318,016 | B1 | * | 11/2001 | Ellig | 43/17.6 |
| 2004/0244265 | A1 | * | 12/2004 | Miyata et al. | 43/17.6 |

\* cited by examiner

*Primary Examiner*—Jong-Suk (James) Lee
*Assistant Examiner*—Robert J May
(74) *Attorney, Agent, or Firm*—Neustel Law Offices

(57) ABSTRACT

A fishing rod illumination system for fishing lures that utilize fiber-optics to attract fish. The fishing rod illumination system includes a fishing reel, a light source within the fishing reel, a control pad in communication with the light source to control the light source, and a length of fiber optic fishing line connected to the fishing reel. The light source and control pad may also be encased within an auxiliary casing separate than the fishing reel, wherein the light source is directed via a supply cord toward the fiber optic fishing line while in use.

20 Claims, 12 Drawing Sheets

FISHING ROD ILLUMINATION SYSTEM

CROSS REFERENCE TO RELATED APPLICATIONS

I hereby claim benefit under Title 35, United States Code, Section 120 of U.S. patent application Ser. No. 11/349,580 filed Feb. 7, 2006. This application is a continuation in-part of the Ser. No. 11/349,580 now U.S. Pat. No. 7,347,607 application. The Ser. No. 11/349,580 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fishing rods and more specifically it relates to a fishing rod illumination system for increasing the odds of catching fish for fishermen of all skill levels.

2. Description of the Related Art

Any discussion of the prior art throughout the specification should in no way be considered as an admission that such prior art is widely known or forms part of common general knowledge in the field.

Fishing rods have been in use for years. Conventional fishing rods are comprised of an elongated rod, a reel attached to an end of the elongated rod and a length of fishing line attached to the reel extending through eyelets on the rod. A fishing hook, lure and/or bait is attached to the distal portion of the fishing line which is used to catch fish. The main problem with conventional fishing rods is that they require natural light to illuminate the lures. There are fishing lures that utilize fiber-optics to attract fish or light sticks, however if the fishing line is broken the light source is also lost.

While these devices may be suitable for the particular purpose to which they address, they are not as suitable for increasing the odds of catching fish for fishermen of all skill levels. Conventional fishing rods do not provide a separate light source for illuminating a fishing hook, lure and/or bait attached to the fishing line.

In these respects, the fishing rod illumination system according to the present invention substantially departs from the conventional concepts and designs of the prior art, and in so doing provides an apparatus primarily developed for the purpose of increasing the odds of catching fish for fishermen of all skill levels.

BRIEF SUMMARY OF THE INVENTION

In view of the foregoing disadvantages inherent in the known types of fishing rods now present in the prior art, the present invention provides a new fishing rod illumination system construction wherein the same can be utilized for increasing the odds of catching fish for fishermen of all skill levels.

The general purpose of the present invention, which will be described subsequently in greater detail, is to provide a new fishing rod illumination system that has many of the advantages of the fishing rods mentioned heretofore and many novel features that result in a new fishing rod illumination system which is not anticipated, rendered obvious, suggested, or even implied by any of the prior art fishing rods, either alone or in any combination thereof.

To attain this, the present invention generally comprises a fishing reel, a light source within the fishing reel, a control pad in communication with the light source to control the light source, and a length of fiber optic fishing line connected to the fishing reel. The light source and control pad may also be encased within an auxiliary casing separate than the fishing reel, wherein the light source is directed via a supply cord toward the fiber optic fishing line while in use.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fishing rod illumination system that will overcome the shortcomings of the prior art devices.

A second object is to provide a fishing rod illumination system for increasing the odds of catching fish for fishermen of all skill levels.

Another object is to provide a fishing rod illumination system that may be utilized on various styles, types and brands of fishing rods.

An additional object is to provide a fishing rod illumination system that may be added to an existing fishing rod or fishing apparatus, or constructed as a new fishing rod.

A further object is to provide a fishing rod illumination system that effectively illuminates a fishing hook, lure and/or bait.

Another object is to provide a fishing rod illumination system that allows for the adjustment of the color, intensity, and/or pulse rate of the light used to illuminate the fishing hook, lure and/or bait.

A further object is to provide a fishing rod illumination system that draws fish towards a fishing hook, lure and/or bait.

A further object is to provide a fishing rod illumination system that produces one or more light sources for increasing the enticement of fish.

A further object is to provide a fishing rod illumination system that may be utilized in various water conditions (e.g. dark, murky).

A further object is to provide a fishing rod illumination system that includes an external or an auxiliary control pad to be carried separably than the fishing reel.

A further object is to provide a fishing rod illumination system that includes a removable programmable device (e.g. microchip, etc.) that may be connected to the control unit to transfer pre programmed illuminations and/or sounds through the fiber optic fishing line.

A further object is to provide a fishing rod illumination system that includes a fishing lure including a plurality of internal fiber optic transfer members to uniformly light the entire fishing lure.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
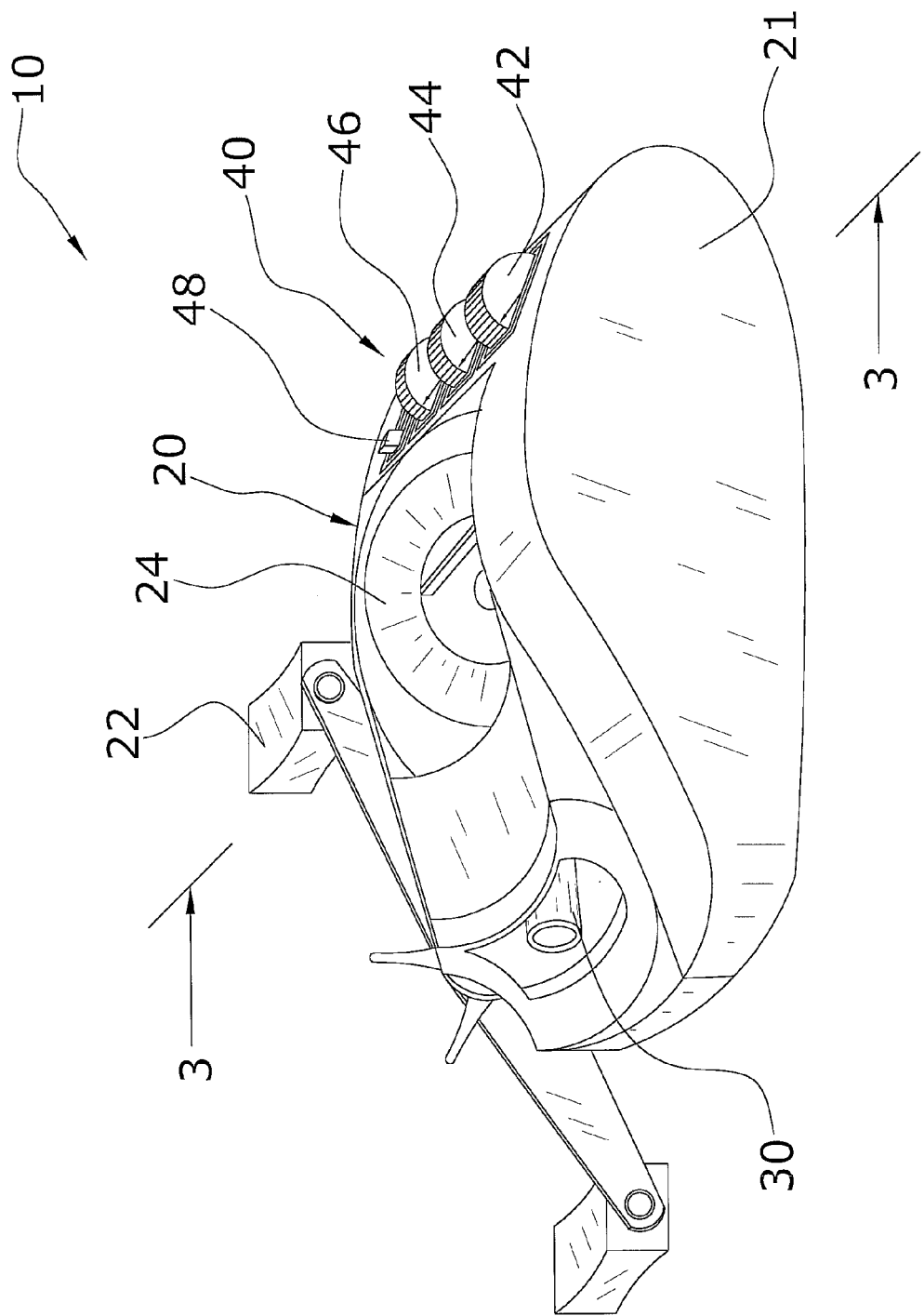
FIG. 1 is an upper perspective view of the present invention.

Turning now descriptively to the drawings, in which similar reference characters denote similar elements throughout the several views, FIGS. 1 through 13 illustrate a fishing rod illumination system 10, which comprises a fishing reel 20, a light source within the fishing reel 20, a control pad 40 in communication with the light source to control the light source, and a length of fiber optic fishing line 60 connected to the fishing reel 20.

B. Fishing Reel

Figure 2:
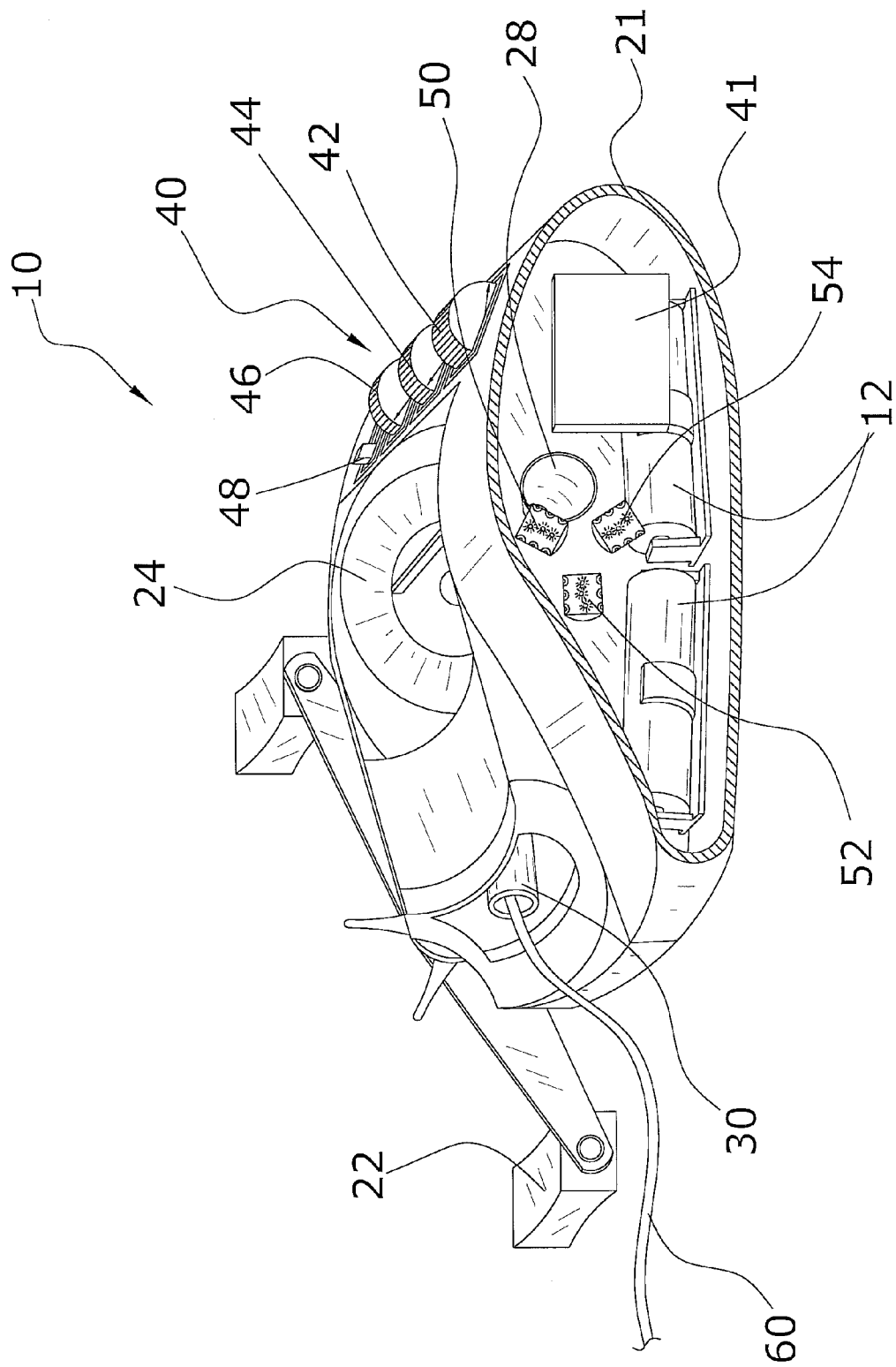
FIG. 2 is an upper perspective partial cutaway of the present invention.
Figure 5:
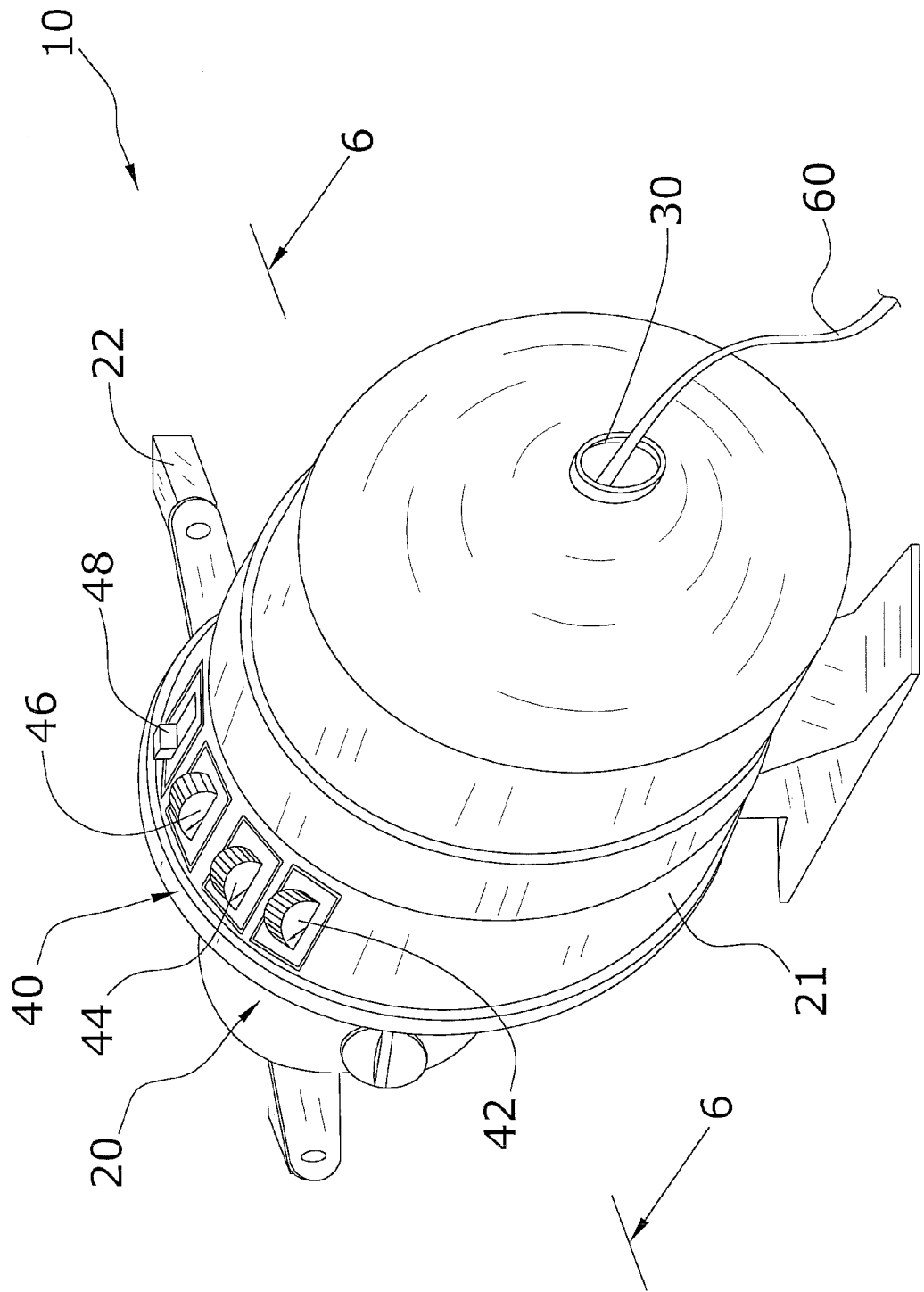
FIG. 5 is an upper perspective view of the present invention embodied in a different reel design.

FIGS. 1, 2 and 5 illustrate exemplary fishing reels 20 suitable for use in the present invention. The type of fishing reel 20 used for the present invention is not significant as long as it is capable of receiving and dispensing a length of the fiber optic fishing line 60. The fishing line is attached to the fishing rod 14 utilizing conventional fastener methods used to secure conventional reels to conventional rods.

Figure 3:
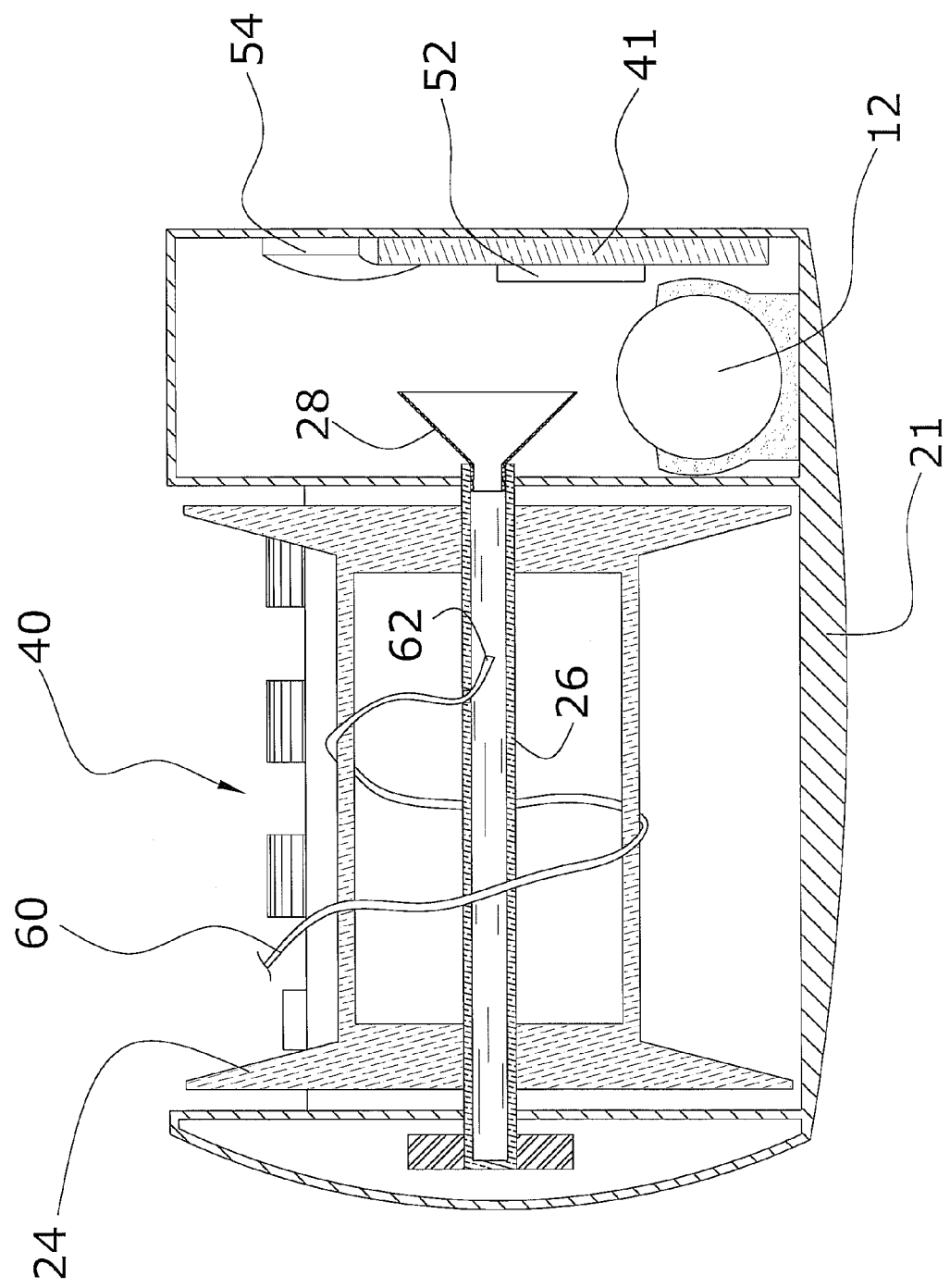
FIG. 3 is a cross sectional view taken along line 3-3 of FIG. 1.
Figure 4:
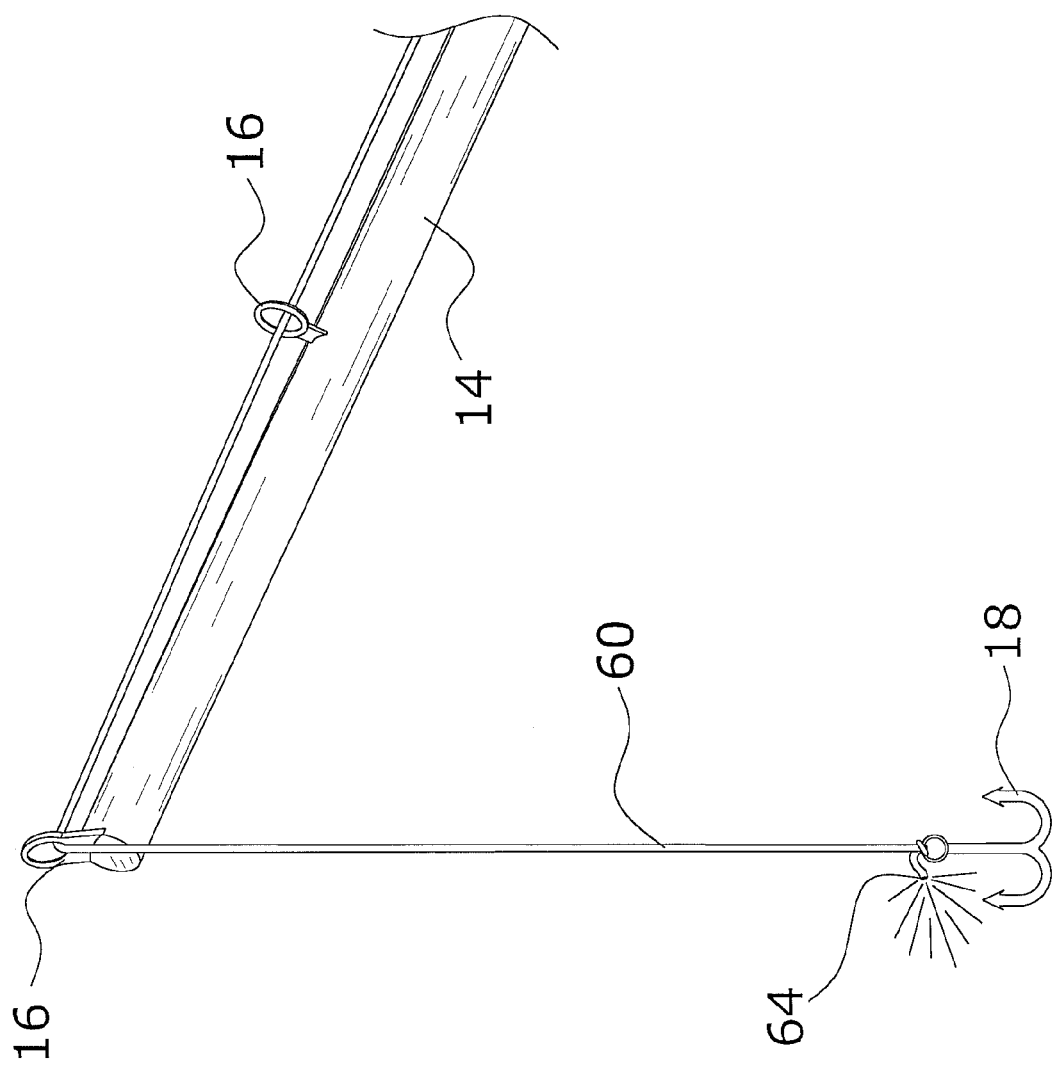
FIG. 4 is a magnified upper perspective view of the upper part of the rod with the fiber optic fishing line illuminating a fishing hook.

The fishing reel 20 includes a housing 21 with an interior cavity 25 that receives the light source as shown in FIGS. 1 through 3 of the drawings. The housing 21 may have various shapes and structures as can be appreciated. The housing 21 stores a significant portion of the present invention including electrical components.

The fishing reel 20 includes a spool 24 that receives and dispenses the length of fiber optic fishing line 60 as best illustrated in FIGS. 2 and 3 of the drawings. A handle 22 is mechanically connected to the spool 24 to rotate the spool 24 in a clockwise or counterclockwise direction as are conventionally used in the fishing industry.

The fishing reel 20 preferably includes a tube 26 that has an interior lumen to receive light emitted by the light source as shown in FIG. 3 of the drawings. The inner end 62 of the fiber optic fishing line 60 extends through and into the tube 26 as further shown in FIG. 3 of the drawings. The inner end 62 of the fiber optic fishing line 60 is preferably directed substantially towards the light source to collect and efficiently transfer a significant portion of the light emitted by the light source.

A cone 28 is preferably attached to an end of the tube 26 for directing light emitted from the light source into the interior lumen of the tube 26 as shown in FIGS. 2 and 3 of the drawings. The cone 28 is preferably comprised of a light reflective inner surface to efficiently transfer the light into the tube 26. The light source is preferably positioned substantially in opposition to the broad opening of the cone 28 as shown in FIG. 2 of the drawings.

Figure 10:
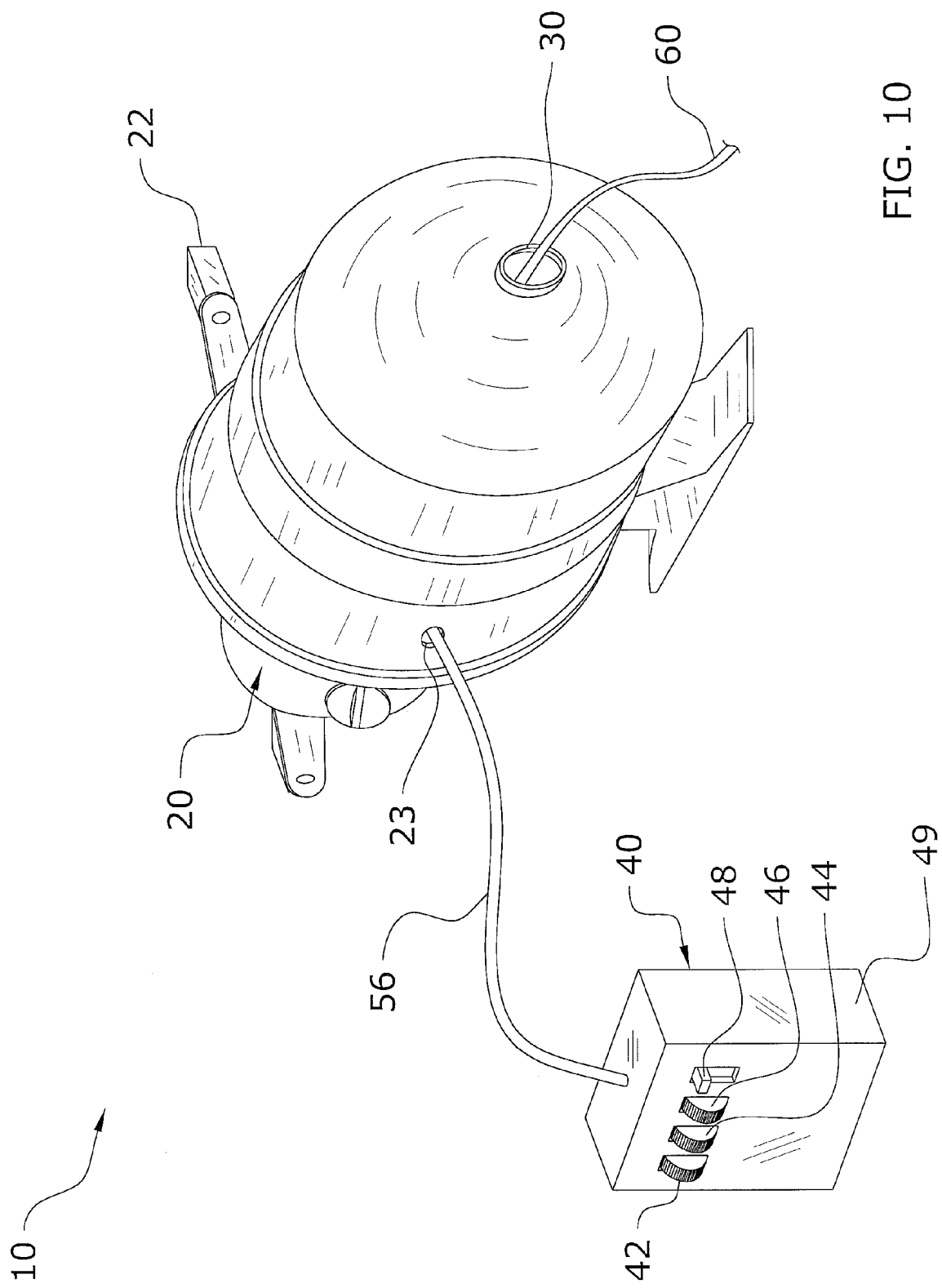
FIG. 10 is an upper perspective view of an alternate embodiment of the present invention including an external control pad.
Figure 11:
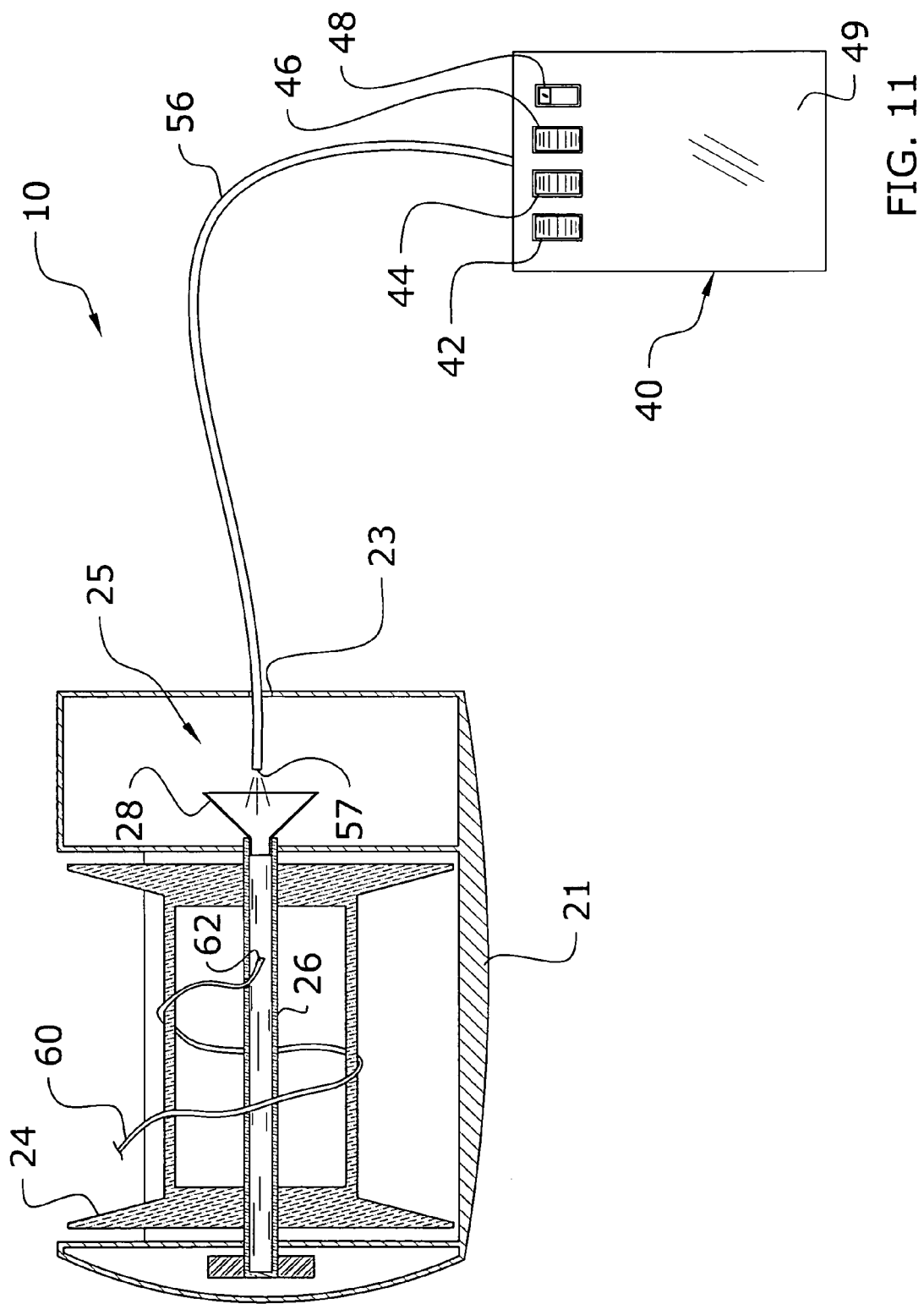
FIG. 11 is a front view of the alternate embodiment of the present invention including an external control pad, wherein the fishing reel is cross sectioned to illustrate the outer end of the supply cord being directed towards the cone and tube.

The housing 21 of the fishing reel 20 also may include an opening 23 to receive the outer end 57 of the supply cord 56 in the alternate embodiment of the present invention as illustrated in FIGS. 10 and 11. The opening 23 preferably interconnects with the cavity 25 of the housing 21 and is further preferably aligned with the cone 28, wherein the opening 23 and the cone 28 are preferably concentric with each other so that when directing the supply cord 56 through the opening 23 the supply cord 56 is automatically directed towards the cone 28.

Figure 13:
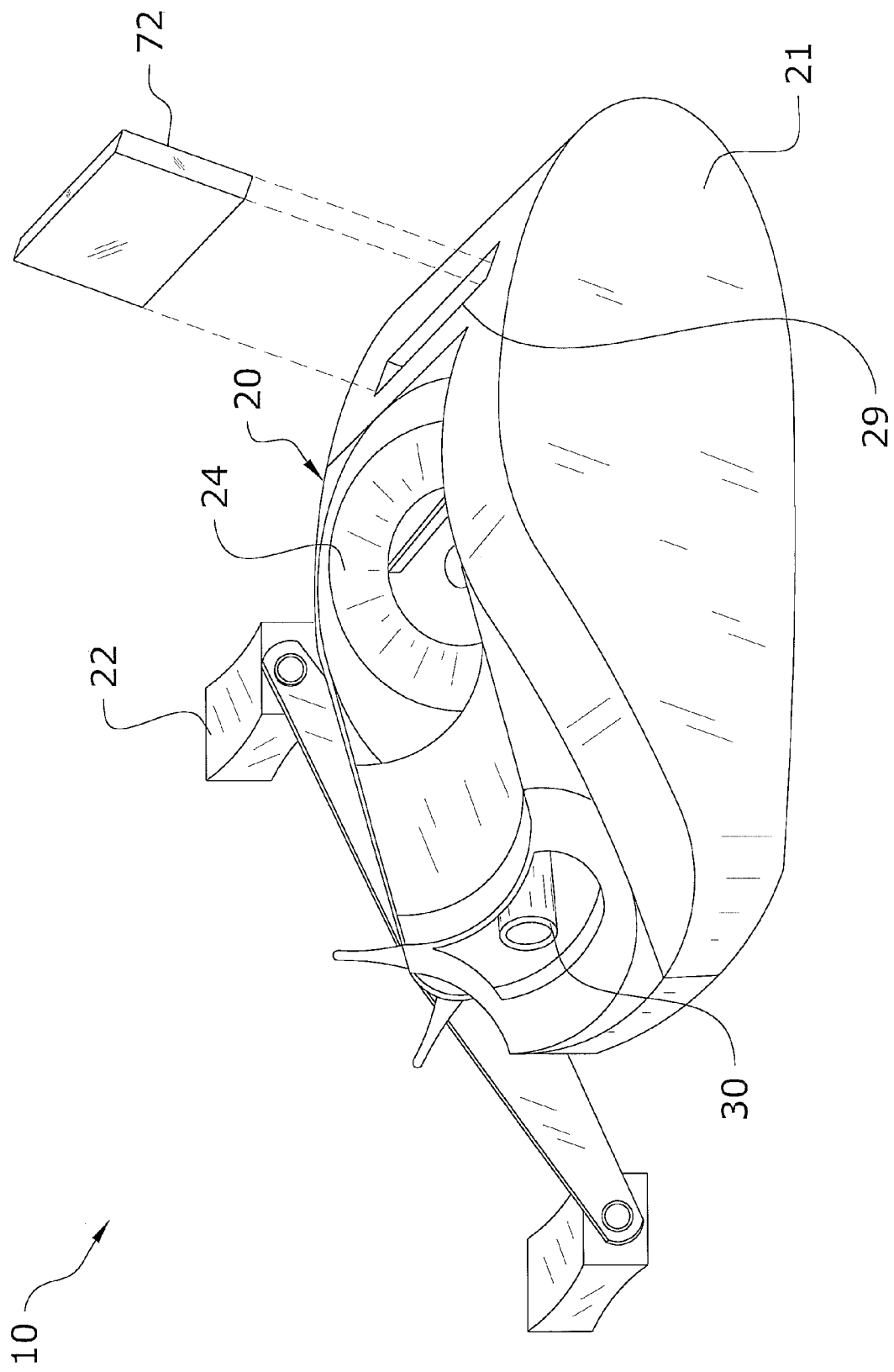
FIG. 13 is an upper perspective view of yet another alternate embodiment of the present invention including a removable programmable device to electrically connect to the control unit.

It is appreciated that the housing 21 of the fishing reel 20 may further include a slot 29 to receive a programmable device 72 as illustrated in FIG. 13. The slot 29 is comprised of a configuration to receive microchips or other programmable chips or cards. The slot 29 is further preferably positioned in a location where the programmable device 72 may be inserted and/or removed from the slot 29 easily during the use of the present invention.

C. Light Source

The light source is positioned within the fishing reel 20 and emits light into the fiber optic fishing line 60. The light source may be comprised of various types of light sources. Alternately the light source may be positioned within the casing 49 of the control pad 40, wherein the control pad 40 is comprised of a separate structure than the fishing reel 20.

Figure 6:
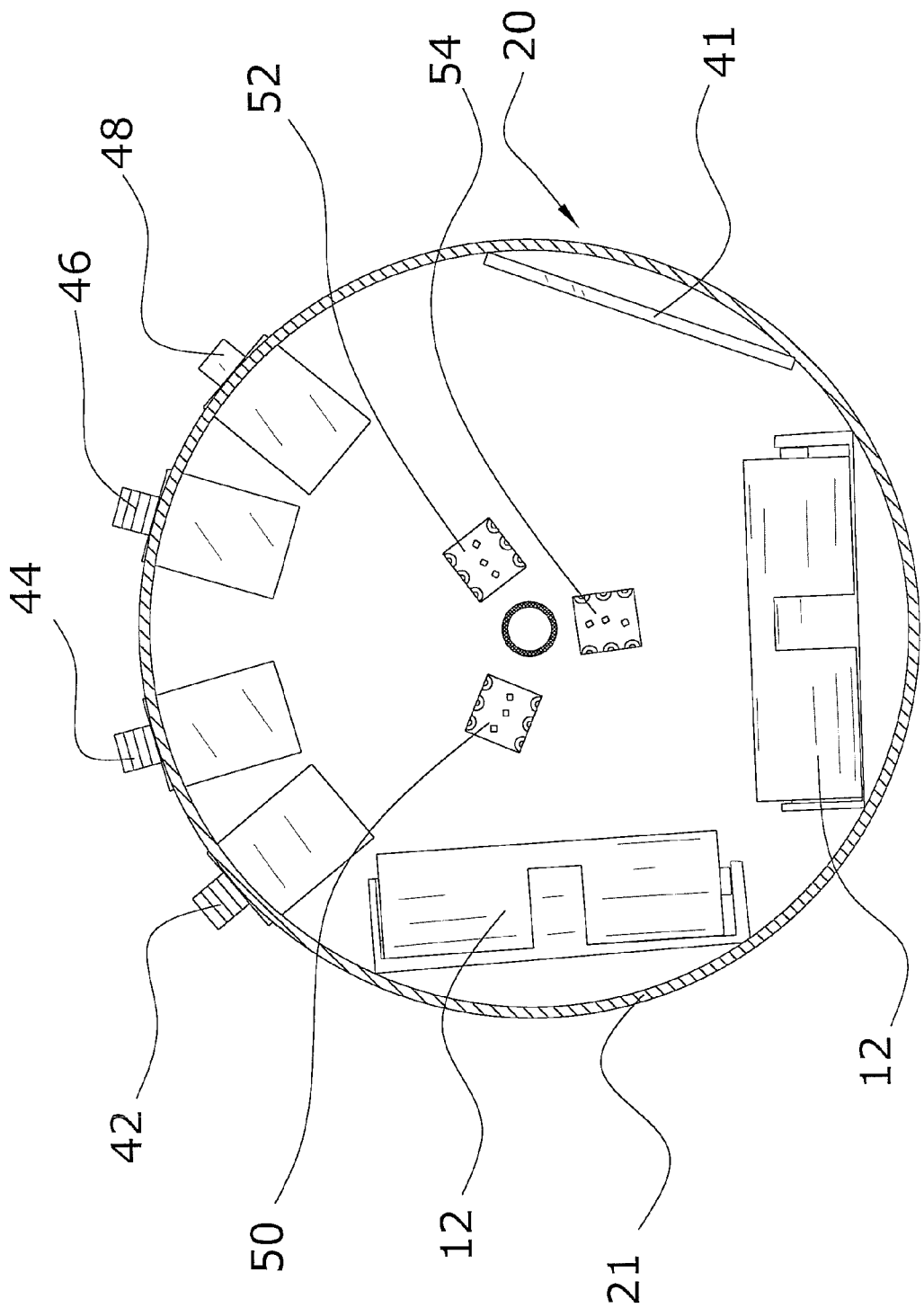
FIG. 6 is a cross sectional view taken along line 6-6 of FIG. 5.

The light source is preferably capable of emitting various light colors preferably at various pulse rates, intensities and color pattern sequences. As shown in FIGS. 2 and 6 of the drawings, the light source is comprised of a first LED 50 emitting a first colored light, a second LED 52 emitting a second colored light and a third LED 54 emitting a third colored light. It is preferable that each of the LEDs 50, 52, 54 emit a different colored light such as the primary colors to allow for the creation of a virtually unlimited number of colors. It is preferably that the first colored light consists of yellow, the second colored light consists of red and the third colored light consists of blue.

D. Controller

Figure 9:
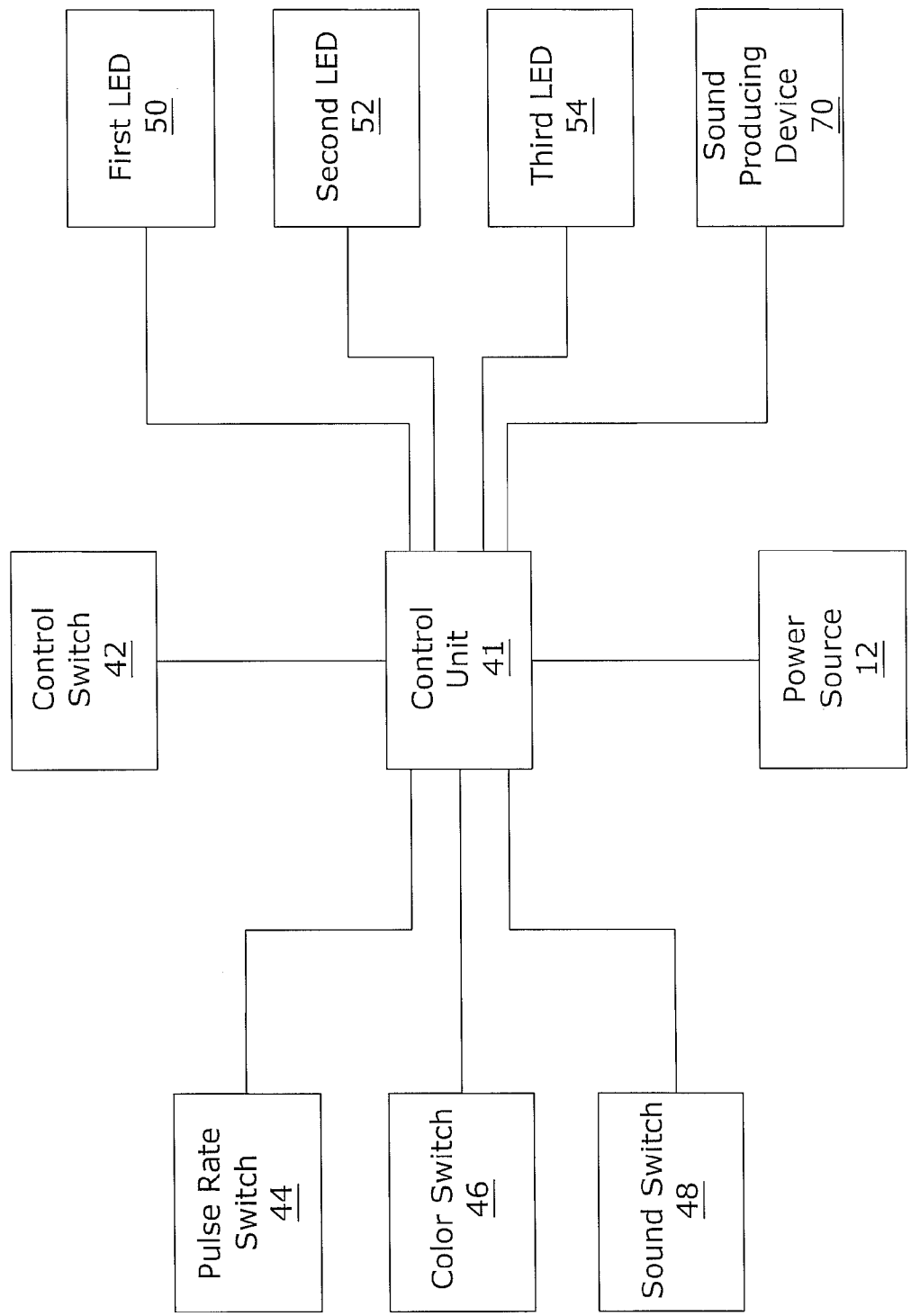
FIG. 9 is a block diagram illustrating the electrical components of the present invention.

The control unit 41 is electrically connected to the light source to control the light source as shown in FIG. 9 of the drawings. A power source 12 (e.g. battery) is electrically connected to the control unit 41 to provide electrical power to all of the electronic devices used in the present invention. In an alternate embodiment of the present invention, the control unit 41 is positioned within the casing 49 of the control pad 40, wherein the control pad 40 is comprised of a separate structure than the fishing reel 20.

The control pad 40 is in communication with the control unit 41 to control the light source (and the sound producing device 70 discussed later). The control pad 40 preferably includes a control switch 42 to turn the light source on or off, a pulse rate switch 44 to control a pulse rate of light emitted by the light source, and a color switch 46 to control a light color emitted by the light source as illustrated in FIGS. 1, 2, 3, 5, 6 and 9 of the drawings. The light color emitted may be adjusted to various light colors, particularly when the three LEDs 50, 52, 54 are utilized.

E. Fiber Optic Fishing Line

The length of fiber optic fishing line 60 is connected to the spool 24 within the fishing reel 20 as shown in FIG. 3 of the drawings. The fiber optic fishing line 60 extends through a line guide 30 within the housing 21 and through the plurality of eyelets 16 on the fishing rod 14.

The fiber optic fishing line 60 is comprised of the inner end 62 positioned within the fishing reel 20 to receive light emitted by the light source as shown in FIG. 3 of the drawings. The distal end 64 of the fiber optic fishing line 60 is for emitting light transferred through the length of fiber optic fishing line 60. The distal end 64 may be frayed into a plurality of structures to provide a plurality of light sources.

The distal end 64 of the fiber optic fishing line 60 is further attached to the fishing hook 18, fishing lure and/or bait ("fishing device") to illuminate the same. The distal end 64 may be positioned inside of the fishing device to illuminate the fishing device from within or positioned external of the fishing device to illuminate the fishing device externally (and to provide an enticing light for fish).

Figure 7:
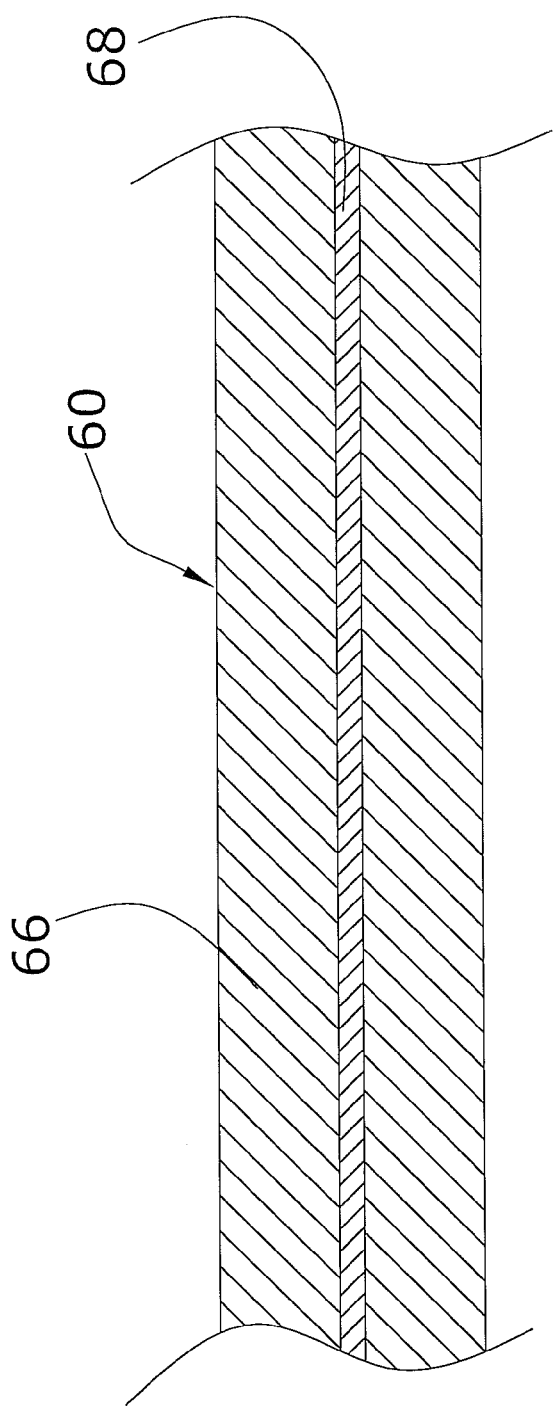
FIG. 7 is a side cutaway view of the fiber optic fishing line illustrating the fiber-optic core surrounded by the monofilament fishing line.
Figure 8:
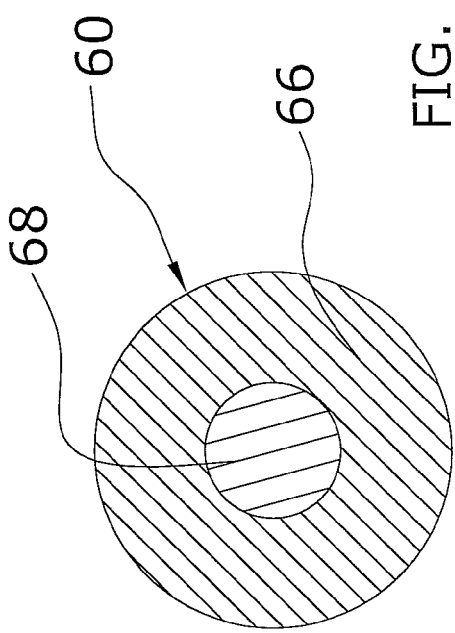
FIG. 8 is a cross sectional view of the fiber optic fishing line illustrating the fiber-optic core surrounded by the monofilament fishing line.

The length of fiber optic fishing line 60 is preferably comprised of a fiber-optic core 68 encased by a monofilament fishing line 66 as best illustrated in FIGS. 7 and 8 of the drawings. However, the fiber optic fishing line 60 may be comprised of other structures capable of transferring light and strong enough to catch a fish.

F. Sound Producing Device

In addition to the illumination properties of the present invention, a sound producing device 70 may be connected to the fiber optic fishing line 60 for generating sound waves within the fiber optic fishing line 60 to be transmitted to a distal end 64 of the fiber optic fishing line 60. The control pad 40 includes a sound switch 48 for controlling the sound level emitted by the sound producing device 70. In an alternate embodiment of the present invention, the sound producing device 70 is positioned within the casing 49 of the control pad 40, wherein the control pad 40 is comprised of a separate structure than the fishing reel 20.

G. Alternate Embodiment of Present Invention

The alternate embodiment illustrates an auxiliary casing 49 that is separate than the fishing reel 20 as illustrated in FIGS. 10 and 11. The alternate embodiment preferably includes the control pad 40, control unit 41, switches 42, 44, 46, 48, LEDs 50, 52, 54, sound producing device 70 and power source 12 within a separate casing 49 than the fishing reel 20. The casing 49 is removable from the fishing reel 20. This allows the user of the present invention to carry the casing 49 within their pocket, upon their belt, upon the ground, attached to the fishing rod itself (i.e. attached externally to the butt of the fishing rod or within the butt of the fishing rod), or various others during use of the present invention.

The external casing 49 and included electrical components then communicate with the fiber optic fishing line 60 through a supply cord 56, wherein the supply cord 56 is directed towards the cone 28 in a similar manner as done with the light of the LEDs 50, 52, 54 and the sound of the sound producing device 70 when positioned within the fishing reel 20.

Utilizing the alternate embodiment including the separate casing 49 allows the user to better keep the electrical components away from the fishing reel 20 and within their personal possession to help prevent the electrical and/or mechanical components of the casing 49 from becoming wet, being stolen (via stealing the fishing reel 20) or becoming damaged from an individual carelessly setting aside or dropping the fishing reel 20. It is appreciated that the present invention may also include both a first control pad 40, control unit 41, switches 42, 44, 46, 48, LEDs 50, 52, 54, sound producing device 70 and power source 12 positioned within the fishing reel 20 and a second control pad 40, control unit 41, switches 42, 44, 46, 48, LEDs 50, 52, 54, sound producing device 70 and power source 12 positioned within the external casing 49 in another alternate embodiment of the present invention.

The supply cord 56 may be comprised of various types of cords (e.g, fiber optical cord, fishing line, etc.) capable of transferring light and sound from the casing 49 to the fiber optic fishing line 60 of the fishing reel 20. The supply cord 56 is comprised of a flexible and elongated configuration, wherein the supply cord 56 may efficiently reach from the user's belt, pocket, ground surface, etc. to the fishing reel 20 while the fishing reel 20 is in use and the user is fishing.

The supply cord 56 is connected, or properly receives sound and light in an efficient manner from the LEDs 50, 52, 54 and sound producing device 70, wherein the supply cord 56 transfers the received sound and/or light to the outer end 57 (i.e. opposite end) of the supply cord 56. The transferred sound and/or light is then directed towards the cone 28, wherein the sound and/or light enters the tube 26 and is received by the fiber optic fishing line 60. It is appreciated that the supply cord 56 may simply be loosely inserted within the opening 23 of the housing 21 to direct the light and/or sound to the fiber optic fishing line 60 or may be connected to the fishing reel 20 in various manners.

An alternate embodiment may also include a programmable device 72 as illustrated in FIG. 13. The programmable device 72 may be comprised of various types of microchips and/or computer readable cards capable of communicating or transferring data to the control unit 41. The programmable device 72 may include various types of preprogrammed color sequences (e.g. red-blue-red-purple for bass, green-yellow-green-yellow for crappie etc.) or sound sequences stored upon the programmable device 72. It is appreciated that the fishing reel 20 or casing 49 may also include a color monitor to allow the user to know what color is being utilized with the light source 50, 52, 54 and the fishing line 60 and fishing lure 75.

Once inserted within the slot 29 the programmable device 72 communicates with the control unit 41, wherein the control unit 41 subsequently directs the LEDs 50, 52, 54 or sound producing device 70 in a corresponding manner. It is appreciated that the external casing 49 may also include a slot 29, wherein the casing 49 receives the programmable device 72 and the programmable device 72 subsequently functions in a similar manner to as previously described.

H. Illuminated Fishing Lure

Figure 12:
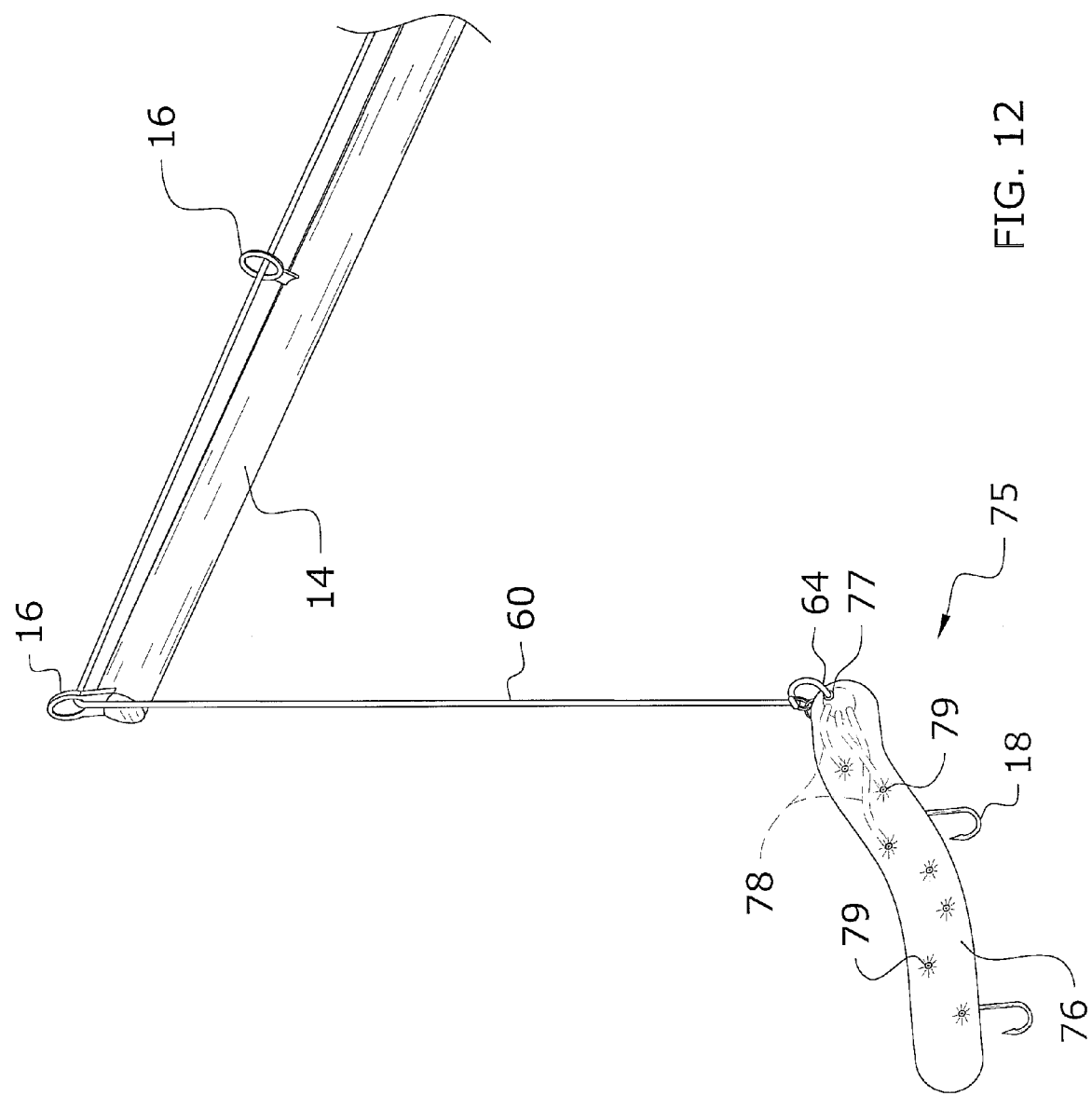
FIG. 12 is a magnified upper perspective view of the upper part of the rod with the fiber optic fishing line illuminating an alternate fishing lure, wherein the fishing line connects to the fishing lure to transfer the light and/or sound to a plurality of transfer members included by the fishing lure, wherein the plurality of transfer members distribute the light and/or sound uniformly about the fishing lure.

The present invention may also include an illuminated fishing lure 75 in conjunction 77 or separate than the fishing reel 20 as illustrated in FIG. 12 The type of fishing lure 75 used for the present invention is not significant as long as it is capable of receiving light and/or sound from an input source (i.e. fiber optic fishing line 60) and emitting the respective light and/or sound.

The fishing lure 75 includes a plurality of transfer members 78 extending throughout the fishing lure 75. The transfer members 78 receive and transfer light and/or sound from a junction 77 to an output portion 79 of the transfer members 78. The transfer members 78 may be comprised of various materials, such as but not limited to a fiber optic configuration or fiber optic fishing line as described in the present invention.

The transfer members 78 are also preferably directed throughout a body portion 76 of the fishing lure 75, wherein the transfer members 78 preferably uniformly cover the entire surface area of at least the body portion 76 of the fishing lure 75. It is appreciated that the transfer members 78 may be positioned within the fishing lure 75 or run along an outer surface of the fishing lure 75.

The fishing lure 75 may include numerous transfer members 78 extending from the junction 77, wherein each transfer member 78 may transmit a different color light and/or sound to a different region upon the body portion 76 of the fishing lure 75. The outer surface of the body portion 76 of the fishing lure 75 may also be comprised of various colors to enhance or differentiate the fishing lure 75, such as but not limited to a milky color or a sparkly color.

The junction 77 preferably interconnects and allows light and/or sound to electrically transfer from an input source (i.e. distal end 64 of the fiber optic fishing line 60 from the fishing reel 20) to an output source (i.e. transfer members 78). The junction 77 may be comprised of various configurations, all which allow a secure connection between the input source and the output source.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A fishing rod illumination system, comprising:
    a fishing reel having a tube with interior lumen extending therethrough;
    a length of fiber optic fishing line connected to said fishing reel, wherein said length of fiber optic fishing line has an end that extends through and into the lumen of the tube to receive emitted light;
    a portable auxiliary casing separate from said fishing reel;
    a light source positioned within said auxiliary casing, wherein said light source is capable of emitting various light colors of light at various pulse rates;
    a supply cord extending from said auxiliary casing and having a first end in visible communication with said light source and having a second end facing the an end of the tube transferring the emitted light from said light source within said auxiliary casing to said length of fiber optic fishing line; and
    a control pad attached to said auxiliary casing and in communication with said light source to control said light source.

2. The fishing rod illumination system of claim 1, wherein said auxiliary casing includes a sound producing device to transmit various sounds to said length of fiber optic fishing line.

3. The fishing rod illumination system of claim 2, wherein said sound producing device is in communication with said control pad.

4. The fishing rod illumination system of claim 2, including a removable programmable chip to communicate with and control said sound producing device and cause said sound producing device to output a particular audio sequence and to control said light source and cause said light source to output a particular light sequence.

5. The fishing rod illumination system of claim 4, wherein said supply cord is removably positioned within said fishing reel.

6. The fishing rod illumination system of claim 1, wherein said length of fiber optic fishing line is comprised of a fiber-optic core encased by a monofilament fishing line.

7. The fishing rod illumination system of claim 1, including a programmable device to direct said light source to emit a particular light sequence.

8. The fishing rod illumination system of claim 7, wherein said programmable device is comprised of a microchip.

9. The fishing rod illumination system of claim 1, wherein said fishing reel includes a tube that has an interior lumen to receive light emitted by said light source.

10. The fishing rod illumination system of claim 9, wherein an inner end of said fiber optic fishing line extends through and into said tube.

11. The fishing rod illumination system of claim 1, wherein said fishing reel includes a spool that receives and dispenses said length of fiber optic fishing line.

12. The fishing rod illumination system of claim 1, wherein said control pad includes a control switch to turn said light source on or off.

13. The fishing rod illumination system of claim 1, wherein said control pad includes a pulse rate switch to control a pulse rate of light emitted by said light source.

14. The fishing rod illumination system of claim 1, wherein said control pad includes a color switch to control a light color emitted by said light source.

15. The fishing rod illumination system of claim 1, wherein said second end of said supply cord is loosely positioned within said opening of said fishing reel.

16. The fishing rod illumination system of claim 1, wherein said auxiliary casing is comprised of a pocket-sized structure.

17. The fishing rod illumination system of claim 1, including a fishing lure connected to said length of fiber optic fishing line opposite said fishing reel, said fishing lure including:
   a body portion;
   a plurality of transfer members each having an input portion and an output portion, wherein said input portion of said plurality of transfer members commonly meet;
   wherein said output portion of said plurality of transfer members are dispersed throughout said body portion;
   wherein at least some of said plurality of transfer members are entirely internal within said body portion;
   wherein said plurality of transfer members are each comprised of a fiber-optic configuration to transmit light from said input portion to said output portion; and
   a junction connected to said body portion and in communication with said input portion of said plurality of transfer members;
   wherein said junction is adapted to receive light from said length of fiber optic fishing that is connected to said junction.

18. An illuminated fishing lure system, comprising:
   a fishing lure including a body portion;
   a plurality of transfer members each having an input portion and an output portion, wherein said input portion of said plurality of transfer members commonly meet;
   wherein said output portion of said plurality of transfer members are dispersed throughout said body portion of said fishing lure;
   wherein at least some of said plurality of transfer members are entirely internal within said body portion of said fishing lure;
   wherein said plurality of transfer members are each comprised of a fiber-optic configuration to transmit light and/or sound from said input portion to said output portion; and
   a junction connected to said body portion of said fishing lure and in communication with said input portion of said plurality of transfer members;
   wherein said junction is adapted to receive light and/or sound from a light source and/or sound source in communication with a fiber-optic fishing line that is connected to said junction.

19. The fishing rod illumination system of claim 18, wherein said body portion includes at least one hook.

20. A fishing rod illumination system, comprising:
   a fishing reel having a housing and a spool rotatably connected to said housing, wherein said spool has a tube;
   wherein said housing of said fishing reel includes a defined cavity external to said spool and wherein said housing includes an opening extending therethrough and communicatively connected to said cavity;
   a length of fiber optic fishing line having a first end connected to said fishing reel and extending within said tube, wherein the first end receives emitted light or sound via said tube being aligned with said opening;
   wherein said length of fiber optic fishing line is comprised of a fiber-optic core encased by a monofilament fishing line;
   a fishing lure connected to a second end of said length of fiber optic fishing line opposite said fishing reel;
   wherein said fishing lure includes a plurality of transfer members each having an input portion and an output portion;
   wherein said output portion of said plurality of transfer members are dispersed throughout said fishing lure and wherein at least some of said plurality of transfer members are entirely internal within said fishing lure;
   wherein said plurality of transfer members are each comprised of a fiber-optic configuration to transmit light from said input portion to said output portion;
   wherein said fishing lure includes a junction for connecting to said second end of said length of fiber optic fishing line, wherein said junction is in communication with said input portion of said plurality of transfer members;
   a portable auxiliary casing separate from said fishing reel, wherein said auxiliary casing is comprised of a pocket-sized structure;
   a power source within said auxiliary casing; a control unit connected to said power source; at least one light source positioned within said auxiliary casing and connected to said control unit, wherein said at least one light source is capable of emitting various light colors at various pulse rates;
   an audio producing device positioned within said auxiliary casing and connected to said control unit, wherein said audio producing device is capable of emitting various sounds; a control pad attached to said auxiliary casing and in communication with said control unit to operatively control said at least one light source and sound producing device; and a supply cord freely extending from said auxiliary casing; wherein said supply cord has a first end in communication with said light source and said audio producing device;
   wherein said supply cord has a second end adapted to be freely and removably positioned within said opening of said housing of said fishing reel;
   wherein said second end of said supply cord is adapted to be directed toward said tube to emit a light from said light source and/or a sound from said audio producing device to be transferred to said first end of said length of fiber optic fishing line and subsequently transfers to said plurality of transfer members of said fishing lure via said length of fiber optic fishing line.

* * * * *